United States Patent [19]

Hermann

[11] Patent Number: 4,668,993
[45] Date of Patent: May 26, 1987

[54] TWO-PIECE MOUNTING BRACKETS AND METHOD FOR APPLYING THEM TO CATHODE RAY TUBES

[75] Inventor: Kenneth W. Hermann, Rochester, N.Y.

[73] Assignee: North American Philips Consumer Electronics Corp., New York, N.Y.

[21] Appl. No.: 902,822

[22] Filed: Sep. 2, 1986

[51] Int. Cl.$^4$ ............................................... H04N 5/65
[52] U.S. Cl. ................................... 358/248; 358/246; 206/329; 220/2.1 A
[58] Field of Search ....................... 358/246, 248, 249; 206/329; 220/2.1 A

[56] References Cited

U.S. PATENT DOCUMENTS 3,651,257  3/1972  Goetz, Jr. .......................... 358/248
4,360,837  11/1982  Kreidler .............................. 358/246

Primary Examiner—Edward L. Coles, Sr.
Attorney, Agent, or Firm—John C. Fox

[57] ABSTRACT

Accurate placement of mounting brackets on cathode ray tubes involves the use of a two-piece mounting bracket including a basal flange and a top plate. The basal flange is attached to the tube's implosion band prior to banding of the tube. The top plate is then attached to the basal flange after banding.

12 Claims, 12 Drawing Figures

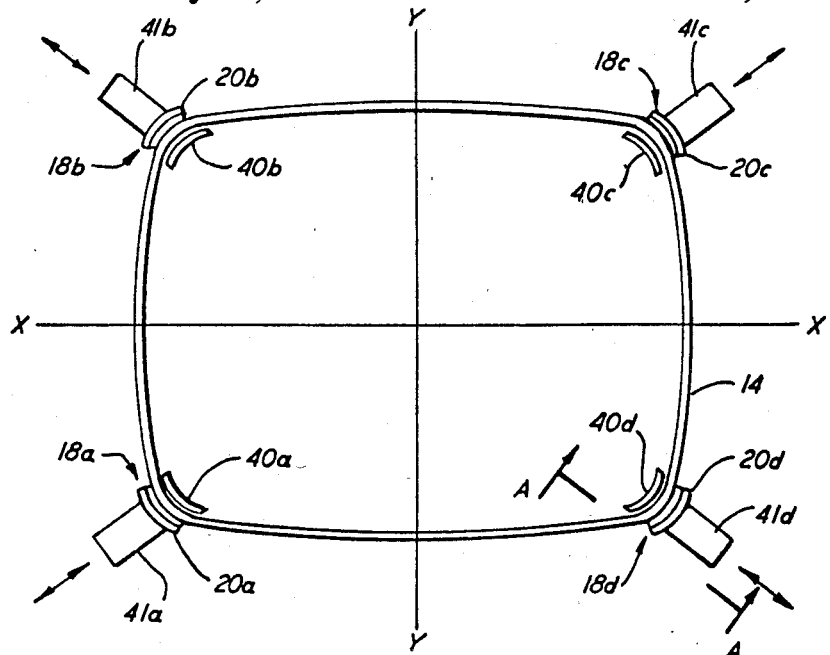
FIG. 4
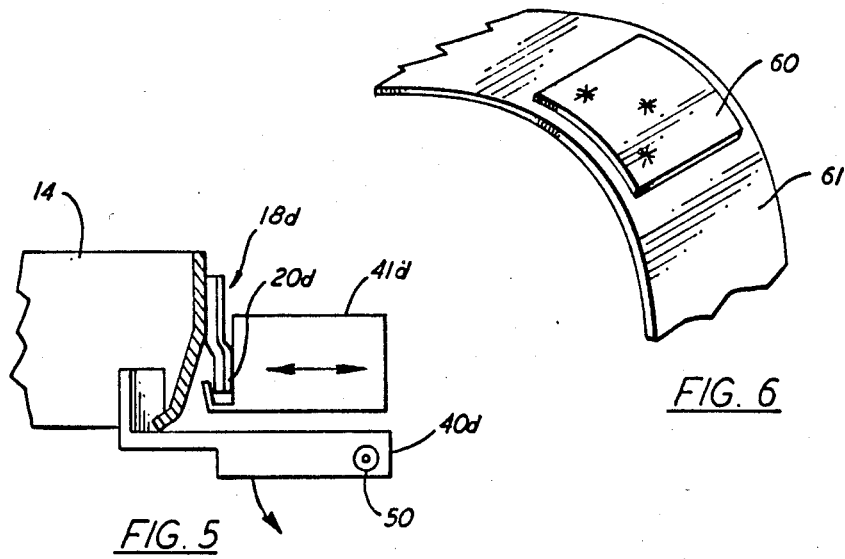
FIG. 5
FIG. 6

TWO-PIECE MOUNTING BRACKETS AND METHOD FOR APPLYING THEM TO CATHODE RAY TUBES

BACKGROUND OF THE INVENTION

This invention relates to a method for applying tube mounting brackets to cathode ray tubes (CRTs), and more particularly relates to a method for attachment of these mounting brackets to the implosion bands of such tubes.

Color CRTs for color television and allied display applications basically comprise an evacuated glass envelope including a face panel portion and a funnel portion, a phosphor screen on the interior surface of the face panel, and an electron gun in the neck of the funnel portion, for generating electron beams to excite the phosphor elements on the screen.

It is customary to place the face panel in mechanical compression by strapping a steel band around the side wall or skirt of the panel, so that in the unlikely event of an implosion, the glass fragments will tend to be contained within the tube area or only a short distance away from it. Such bands are known as implosion bands. A particular type of implosion band is the so-called tension band, which is applied by wrapping it around the panel skirt, overlapping the ends and fastening these overlapped ends with a tensioning device.

A newer type of implosion band which is coming into increasing use is the shrink band. This is a steel band which is joined end-to-end and preformed prior to placement on the CRT panel. The formed band is then heated to cause thermal expansion sufficient to allow placement of the band around the panel skirt, and then allowed to cool and "shrink" onto the panel, thereby placing the band in tension and the panel in compression.

Implosion bands often perform an added function of supporting tube mounting brackets, used to mount the tubes in a display cabinet. The brackets may be placed under the band and thereby held in place by compression against the glass surface, or may be welded to the outer surface of the band. In either case, accurate placement of the brackets is difficult to achieve, due to uncontrollable variations in panel size and shape, and final band location on the panel.

In the case where the bracket is placed in the desired location on the panel skirt under the band, bracket slippage during and after band placement is a problem. In the case where the brackets are welded to the outer surface of the band, the slippage problem is avoided, but welding must be carried out prior to attachment of the band to the panel, in order to avoid the risk of panel breakage during welding. Thus, accurate placement of the brackets is difficult to achieve, due to the inability to compensate for the random variations among panels and bands, as well as the position of the bands on the panels after assembly.

In the case of shrink bands, present practice is to attach the mounting brackets (called "ears") to the bands prior to shrink fitting the bands onto the tubes, and then to use the attached ears for mechanical support of the bands during shrink fit, by resting the ears on the seats of positioning brackets. The positioning brackets are oversized to allow band movement during heating, tube placement, and shrink fit. This method results in X, Y positioning of the ears to an accuracy of only plus or minus 78 thousandths of an inch.

Accordingly, it is an object of the invention to provide a method for attaching mounting brackets to CRT panels which allows for accurate placement regardless of the variations among panels and bands, and band/panel assembly.

It is another object of the invention to provide a method for accurately attaching mounting brackets to implosion bands after the bands have already been attached to CRT panels.

It is another object of the invention to provide a method for attaching shrink bands without mounting brackets to CRT panels.

SUMMARY OF THE INVENTION

In accordance with the invention, there is provided a two-piece mounting bracket for CRTs comprising a basal flange and an apertured top plate, as well as a method for attaching the mounting bracket to the implosion band of a CRT, the method comprising the steps of: attaching the basal flange to the implosion band; attaching the implosion band to the CRT face panel; positioning the banded CRT accurately with respect to X, Y and Z reference axes; positioning the top plate accurately on the basal flanges with respect to desired x, y, z locations; and attaching the top plate to the basal flange.

In accordance with a preferred embodiment of the invention, basal flanges with a raised lip on one edge of each flange are attached to shrink bands prior to shrink fit. The bands are then expanded by heating and positioned for shrink fit by locating means which engage the raised lips of the basal flanges. After shrink fit has been accomplished by allowing the expanded bands to cool and shrink onto the CRT face panel sidewalls, the top plates of the brackets are attached as described above. Optionally, the top plates may be omitted where the TV set manufacturer employs tube mounting means other than brackets.

BRIEF DESCRIPTION OF THE DRAWINGS

FIG. 4 is a plan view of a shrink band with four basal flanges attached, shown oriented with respect to X and Y axes by coarse and fine locators;

FIG. 5 is a side view along section A—A of the band of FIG. 4, showing one of the basal flanges in association with a set of coarse and fine locators;

FIGS. 6 and 7 are views similar to that of FIG. 2 showing two other embodiments of basal flanges;

DESCRIPTION OF THE PREFERRED EMBODIMENTS

Figure 1:
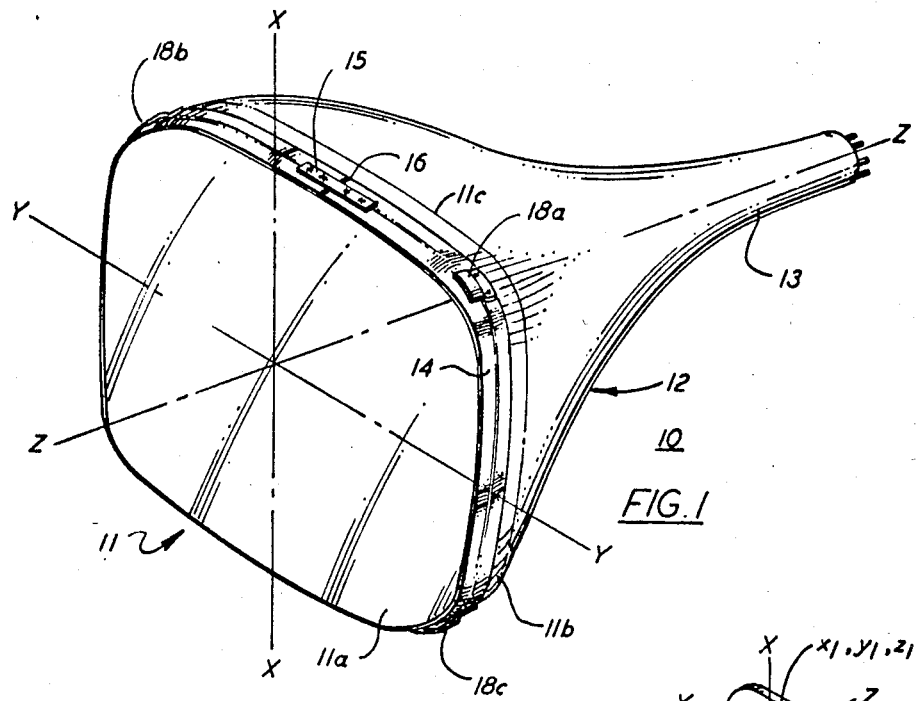
FIG. 1 is a perspective view of an implosion-banded cathode ray tube having four basal flanges attached to the band and being oriented with reference to X, Y and Z axes.
Figure 2:
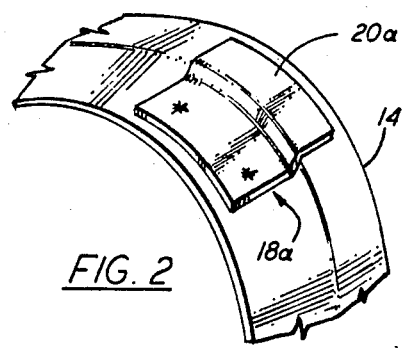
FIG. 2 is a close-up perspective view of a corner portion of the band shown in FIG. 1, including the attached basal flange.

Referring now to FIG. 1, there is shown in perspective an implosion-banded cathode ray tube 10 oriented in space with reference to X, Y, and Z axes. The glass face panel 11, including face 11a and sidewall or skirt 11b, is joined to funnel 12, having a neck portion 13, by a frit seal 11c, located to the rear of implosion band 14. Band 14 is a shrink band, so-called because it is preformed, and then expanded by heating to fit around the panel skirt, and finally allowed to cool, thereby shrinking around the skirt to place the panel in mechanical compression.

Figure 8:
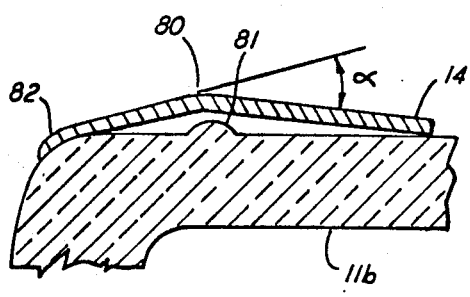
FIG. 8 is a section view of a portion of a CRT face plate and associated implosion band.

The band is formed by first cutting a length of steel strip from a roll, straightening end portions of the strip and then butt welding the straightened ends together to form an egg-shaped hoop. This hoop is then passed between rollers which form a shallow longitudinal bend in the hoop. This bend effectively raises the central portion 80 of the band 14 slightly above the glass surface, to provide clearance for the mold match line 81 on skirt 11b, as shown in FIG. 8. Bend angle alpha ($\alpha$) typically about 5°.

After bending, the hoop is stretched into a rectangular shape corresponding to the outline of the face panel, and the forward edge of the corner portions are rolled over slightly to provide a snug fit with the corners of the face panel. This rolled edge, 82 in FIG. 8, is sometimes referred to as an "eyebrow".

Following stretching, fishplate 15, an elongated metal plate, is welded onto the band 14 across the butt weld 16 for added strength, as shown in FIG. 1. Next, four basal flanges (three of which, 18a, 18b, and 18c, are shown) are welded to the corner portions of band 14.

Next, band 14 is dropped onto a set of four coarse locator blocks 40a, 40b, 40c, and 40d shown in FIG. 4, which position the band with sufficient accuracy to allow engagement of raised lips 20a, 20b, 20c and 20d of basal flanges 18a, 18b, 18c and 18d by fine locators 41a, 41b, 41c and 41d. Following such engagement, shown by partial section view A—A in FIG. 5, coarse locators 40 swing out of the way, about pivot points indicated as 50 for locator 40d in FIG. 5, to allow the band to drop onto the fine locators, which then position the band accurately in the X-Y plane for subsequent heating. After positioning, the fine locator feed mechanisms are disengaged to allow these locators to float during heating, band expansion, and application.

Following band expansion, the tube is inserted into the band. The band is then allowed to shrink into place on the panel skirt.

Due to an accumulation of errors from various sources, use of the above-described banding process results in locating the basal flanges on the tube to an accuracy of only about plus or minus 30 to 70 thousandths of an inch. However, attachment of the basal flanges prior to banding is necessary in order to avoid cracking of the glass under the band during welding of the top plates.

Figure 3:
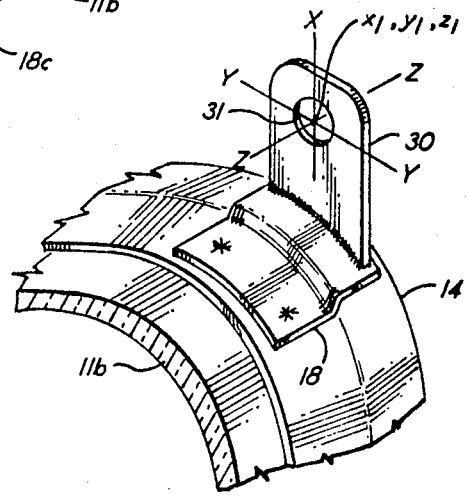
FIG. 3 is a view similar to that of FIG. 2, in which an apertured top plate has been attached to the basal flange at a location to center the aperture at point $x_1$, $y_1$, $z_1$.

Referring now to FIG. 3, after the band has shrunk onto skirt 11b, the tube is oriented in space with reference to X, Y, and Z axes, and top plate or "ear" 30 is welded onto basal flange at a location where the center of aperture 31 corresponds to point $x_1$, $y_1$, $z_1$. By such a technique, ears may be mounted with an accuracy on the order of plus or minus 10 thousandths of an inch. Alternatively, the ears may be omitted in cases in which other mounting arrangements are contemplated.

The ability to accurately place bracket mounting apertures leads to other advantages, including: greater flexibility in cabinet design due to large permissible variation in Z axis placement of top plates on basal flanges; ability to use the same parts interchangeably on different tube sizes and shapes, leading to reduced inventory; increased allowable tolerances on parts and glass leading to lower tooling and material costs; and ability to inexpensively roughen (e.g., by coining) one or both sides of the top plate, thus avoiding the need for separate lock washers.

Figure 7:
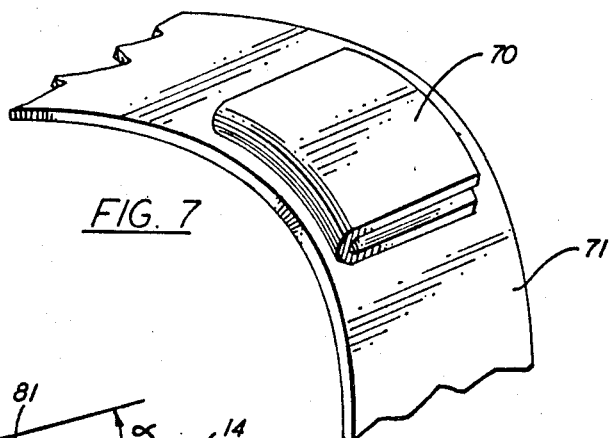

Other embodiments of basal flanges are shown in FIGS. 6 and 7. FIG. 6 shows basal flange 60 having no raised lip. Such an embodiment is suitable for use with conventional tension bands, which bands do not require engagement with separate locating means. Such bands are stretched around the face panel and affixed by a mechanical tensioning or strapping tool. Thus, the basal flange serves only as an attachment surface, not as a holder for band location.

FIG. 7 shows a U-shaped basal flange 70 attached to band 71. Such an embodiment may be useful where large variations in specifications for location in the Z axis direction are anticipated.

Figure 9:
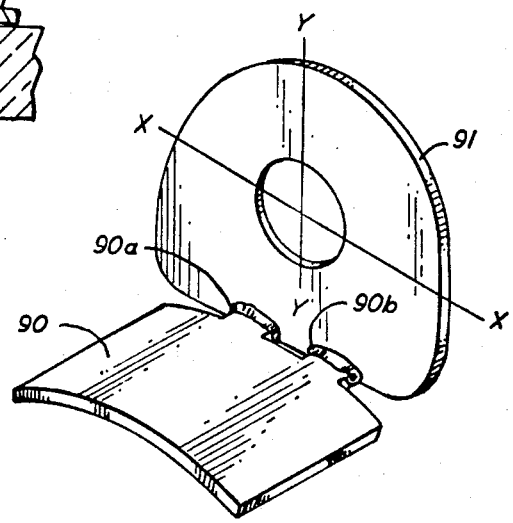
FIG. 9 is a perspective view of one embodiment of a two-piece mounting bracket of the invention.
Figure 10:
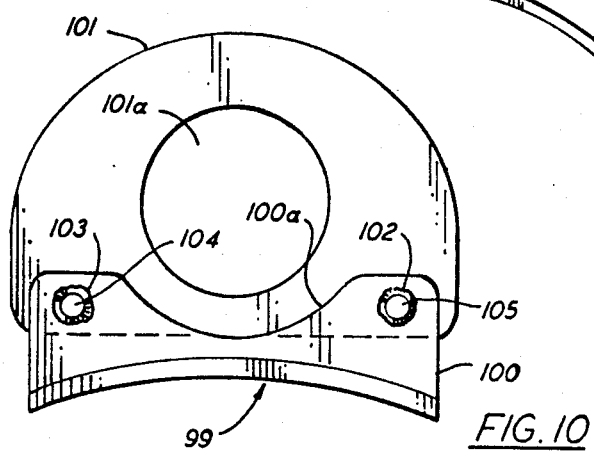
FIG. 10 is a front elevation view of another embodiment of a two-piece mounting bracket of the invention.
Figure 11:
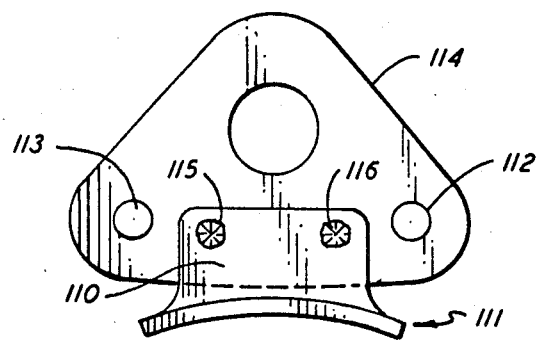
FIG. 11 is a front elevation view of still another embodiment of a two-piece mounting bracket of the invention.

FIGS. 9 through 11 show other embodiments of two-piece mounting brackets of the invention. In FIG. 9, basal flange 90 has two projections from the rear edge of the flange, 90a and 90b, which projections are resistance welded to top plate 91. These projections are advantageous in that in some cases X, Y location is more critical than Z location.

In FIG. 10, basal flange 99 includes upstanding portion 100 having a central saddle 100a. This saddle enables placement of the aperture 101a of top plate 101 closer to the face panel than would otherwise be possible. Attachment, such as by resistance welding, is at locations 102 and 103, surrounding coincident spring mounting apertures 104 and 105 in both the basal flange and top plate.

In FIG. 11, upstanding portion 110 of basal flange 111 is located between spring mounting apertures 112 and 113. Basal flange 111 is attached to top plate 114 by resistance welds 115 and 116.

Figure 12:
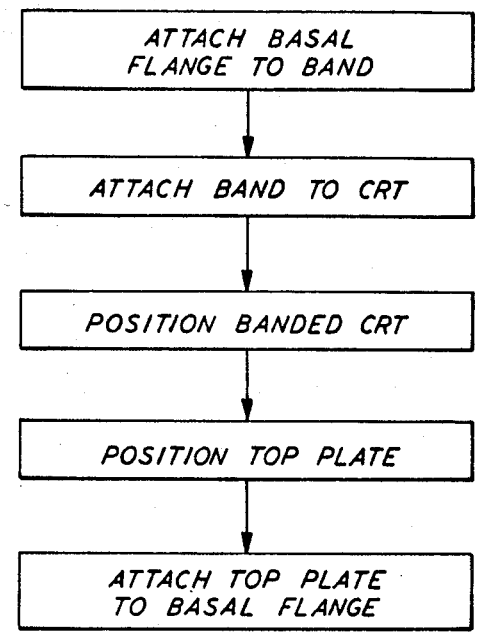
FIG. 12 is a block flow diagram of one embodiment of the method of the invention.

FIG. 12 is a block diagram of the basic steps of the described process.

What is claimed is:

1. A method for attaching mounting brackets comprised of basal flanges and top plates, to the implosion bands of CRTs, the method comprising:
    (a) attaching the basal flanges to the implosion band;
    (b) attaching the flanged implosion band to the CRT;
    (c) positioning the implosion-banded CRT with respect to X, Y and Z reference axes;
    (d) positioning the top plates on the basal flanges with respect to desired x, y and z locations; and
    (e) attaching the top plates to the basal flanges.

2. The method of claim 1 in which the implosion band is attached to the CRT by: forming the band to the final desired size and shape; heating the formed band to thermally expand the band; positioning the expanded band around the CRT; and allowing the expanded band to cool and thereby shrink onto the CRT.

3. The method of claim 2 in which the basal flanges each have a raised lip for engaging means for locating the band with respect to heating means and to a CRT to be banded.

4. The method of claim 1 in which the band is attached to the face panel skirt of the CRT.

5. The method of claim 4 in which the face panel and band are substantially rectangular, and a mounting bracket is attached to each corner region of the band.

6. The method of claim 1 in which the basal flanges are attached to the band and the top plates are attached to the basal flanges by welding.

7. A two-piece mounting bracket comprising a basal flange and an apertured top plate attached to the basal flange.

8. The bracket of claim 7 in which the basal flange has a raised lip portion in the area of attachment to the top plate.

9. The bracket of claim 7 in which the basal flange is U-shaped.

10. The bracket of claim 7 in which the basal flange has at least two projection from one edge of the flange, and in which the top plate is attached to these projections.

11. The bracket of claim 7 in which the basal flange has at least one upstanding portion, and in which the top plate is attached to this portion.

12. The bracket of claim 11 in which the upstanding portion defines a central saddle portion, for accommodating a central aperture of the top plate.

* * * * *